US007308685B2

(12) United States Patent
Talwar et al.

(10) Patent No.: US 7,308,685 B2
(45) **Date of Patent: *Dec. 11, 2007**

(54) EMULATION INTERNAL REPRESENTATION REVISION SYSTEM AND METHOD

(75) Inventors: Vanish Talwar, Mountain View, CA (US); Dongni Chen, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 865 days.

This patent is subject to a terminal disclaimer.

(21) Appl. No.: 10/439,053

(22) Filed: May 14, 2003

(65) Prior Publication Data

US 2004/0230617 A1 Nov. 18, 2004

(51) Int. Cl.
*G06F 9/44* (2006.01)
*G06F 9/46* (2006.01)

(52) U.S. Cl. ...................... 717/168; 717/166; 719/331; 719/332

(58) Field of Classification Search ................ 717/166, 717/168; 719/331, 332
See application file for complete search history.

(56) References Cited

U.S. PATENT DOCUMENTS 5,303,379 A * 4/1994 Khoyi et al. ................ 717/166
6,023,704 A * 2/2000 Gerard et al. ........... 707/103 R
6,163,780 A * 12/2000 Ross .......................... 707/101
6,347,396 B1 * 2/2002 Gard et al. ................. 717/168
6,823,504 B1 * 11/2004 Sokolov ..................... 717/136
2003/0074487 A1 * 4/2003 Akgul et al. ................ 709/328
2003/0191870 A1 * 10/2003 Duggan ...................... 709/331

OTHER PUBLICATIONS

Dmitriev, "Safe Class and Data Evolution in Large and Long-Lived Java Applications", Dissertation, University of Glasgow, Mar. 2001, archived Feb. 2002 at the Internet Archive, accessed Sep. 29, 2006 at <http://web.archive.org/web/20020214001715/www.dcs.gla.ac.uk/~misha/papers/>, 208 pages.*

Danielsson et al., "JDRUMS: Java Distributed Run-time Updating Management System", thesis from Växjö University, archived Jun. 2001 at the Internet Archive, accessed Sep. 29, 2006 at <http://web.archive.org/web/20010614184621/http://www.ida.liu.se/~jengu/jdrums/jdrums.pdf>, 104 pages.*

Evans, "Dynamic On-line Object Update in the Grumps System", Computer Software and Applications Conference, 2002. COMPSAC 2002. Proceedings. 26th Annual International, pp. 1-6.*

(Continued)

*Primary Examiner*—Tuan Dam
*Assistant Examiner*—J. Derek Rutten

(57) ABSTRACT

A present invention emulation internal representation revision method performs revisions on internal representations. In one embodiment of the present invention, an indication of a revision to loaded emulation code is received. Conditions for maintaining consistency are created. An ordered listing for providing an index correspondence to the emulation code is revised. The information from the listing is incorporated in the internal representation of the emulation code, such that a virtual machine implementing the loaded emulation code is not shut down.

20 Claims, 13 Drawing Sheets

OTHER PUBLICATIONS

J. Andersson and T. Ritzau. Dynamic code update in JDrums. In Proceedings of the ICSE'00 Workshop on Software Engineering for Wearable and Pervasive Computing, Limerick, Ireland, 2000, <http://citeseer.ist.psu.edu/article/andersson00dynamic.html>.*

Andersson et al., "Run-time Support for Dynamic Java Architectures", In Proceedings of the ECOOP'98 workshop on Object-Oriented Software Architectures, 1998. Technical report 13/98 University of Karlskrona/Ronneby.*

Welch, I., Stroud, R.J.: Kava—A Reflective Java Based on Bytecode Rewriting. In Cazzola, W., Stroud, R.J., Tisato, F., eds.: Reflection and Software Engineering. Lecture Notes in Computer Science 1826. Springer-Verlag, Heidelberg, Germany (2000) 155-167.*

* cited by examiner

100

| |
|---|
| List Header Section 110 |
| List Class Name Section 120 |
| List Field Section 130 |
| List Method Section 140 |
| List Code Section 150 |
| List Constant Section 155 |

Figure 1B:
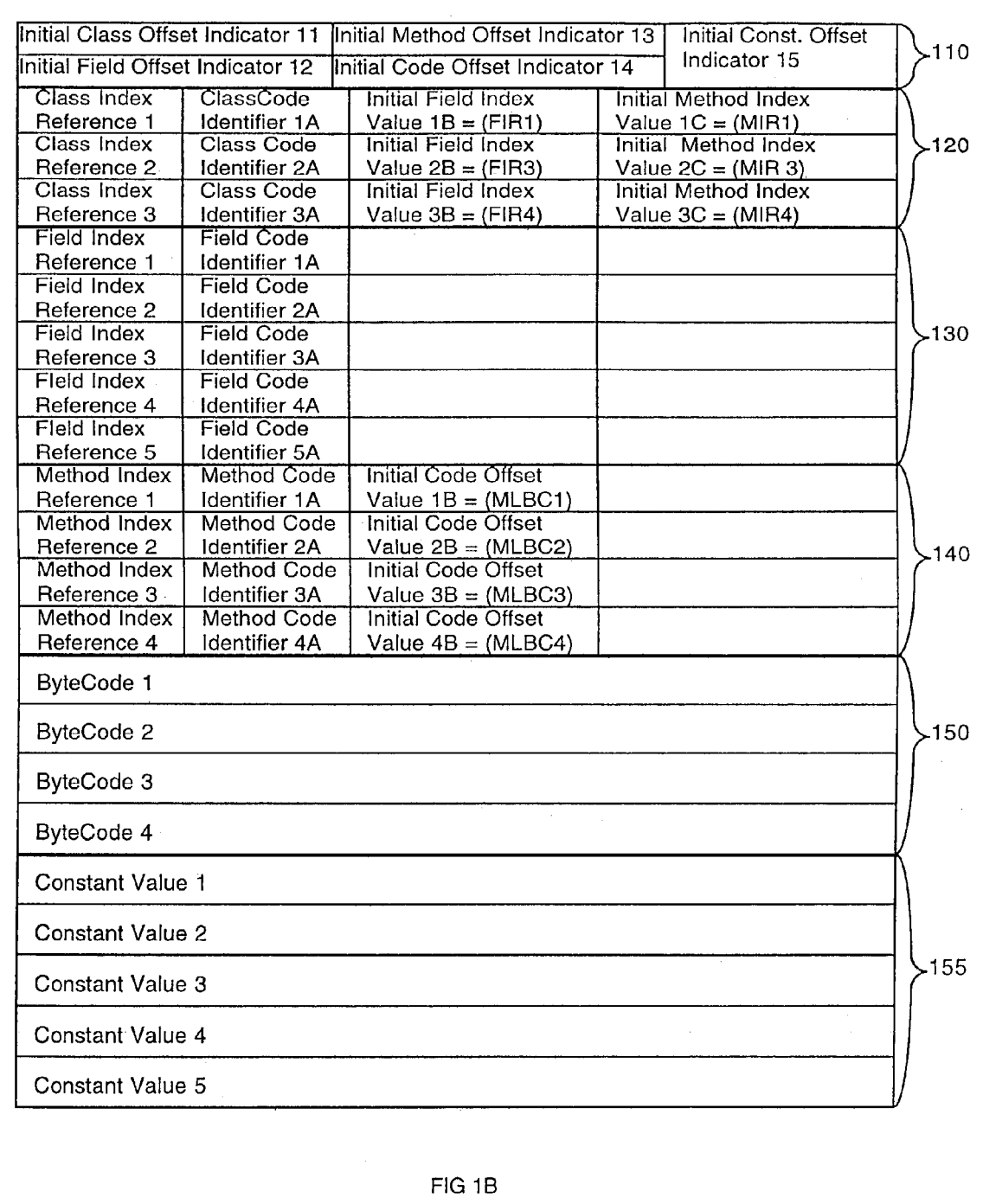

| | | | |
|---|---|---|---|
| Initial Class Offset Indicator 11 | Initial Method Offset Indicator 13 | Initial Const. Offset Indicator 15 | 110 |
| Initial Field Offset Indicator 12 | Initial Code Offset Indicator 14 | | |

| | | | | |
|---|---|---|---|---|
| Class Index Reference 1 | ClassCode Identifier 1A | Initial Field Index Value 1B = (FIR1) | Initial Method Index Value 1C = (MIR1) | 120 |
| Class Index Reference 2 | Class Code Identifier 2A | Initial Field Index Value 2B = (FIR3) | Initial Method Index Value 2C = (MIR 3) | |
| Class Index Reference 3 | Class Code Identifier 3A | Initial Field Index Value 3B = (FIR4) | Initial Method Index Value 3C = (MIR4) | |
| Field Index Reference 1 | Field Code Identifier 1A | | | 130 |
| Field Index Reference 2 | Field Code Identifier 2A | | | |
| Field Index Reference 3 | Field Code Identifier 3A | | | |
| Field Index Reference 4 | Field Code Identifier 4A | | | |
| Field Index Reference 5 | Field Code Identifier 5A | | | |
| Method Index Reference 1 | Method Code Identifier 1A | Initial Code Offset Value 1B = (MLBC1) | | 140 |
| Method Index Reference 2 | Method Code Identifier 2A | Initial Code Offset Value 2B = (MLBC2) | | |
| Method Index Reference 3 | Method Code Identifier 3A | Initial Code Offset Value 3B = (MLBC3) | | |
| Method Index Reference 4 | Method Code Identifier 4A | Initial Code Offset Value 4B = (MLBC4) | | |

| | |
|---|---|
| ByteCode 1 | 150 |
| ByteCode 2 | |
| ByteCode 3 | |
| ByteCode 4 | |
| Constant Value 1 | 155 |
| Constant Value 2 | |
| Constant Value 3 | |
| Constant Value 4 | |
| Constant Value 5 | |

210
Receiving an indication of a revision to emulation code.

215
Create conditions for maintaining processing consistency without shuting down the emulation virtual machine.

220
Revising an ordered listing for providing an index correspondence to the emulation code.

230
Incorporating information from a revised version of the ordered listing in an internal representation of the loaded emulation code.

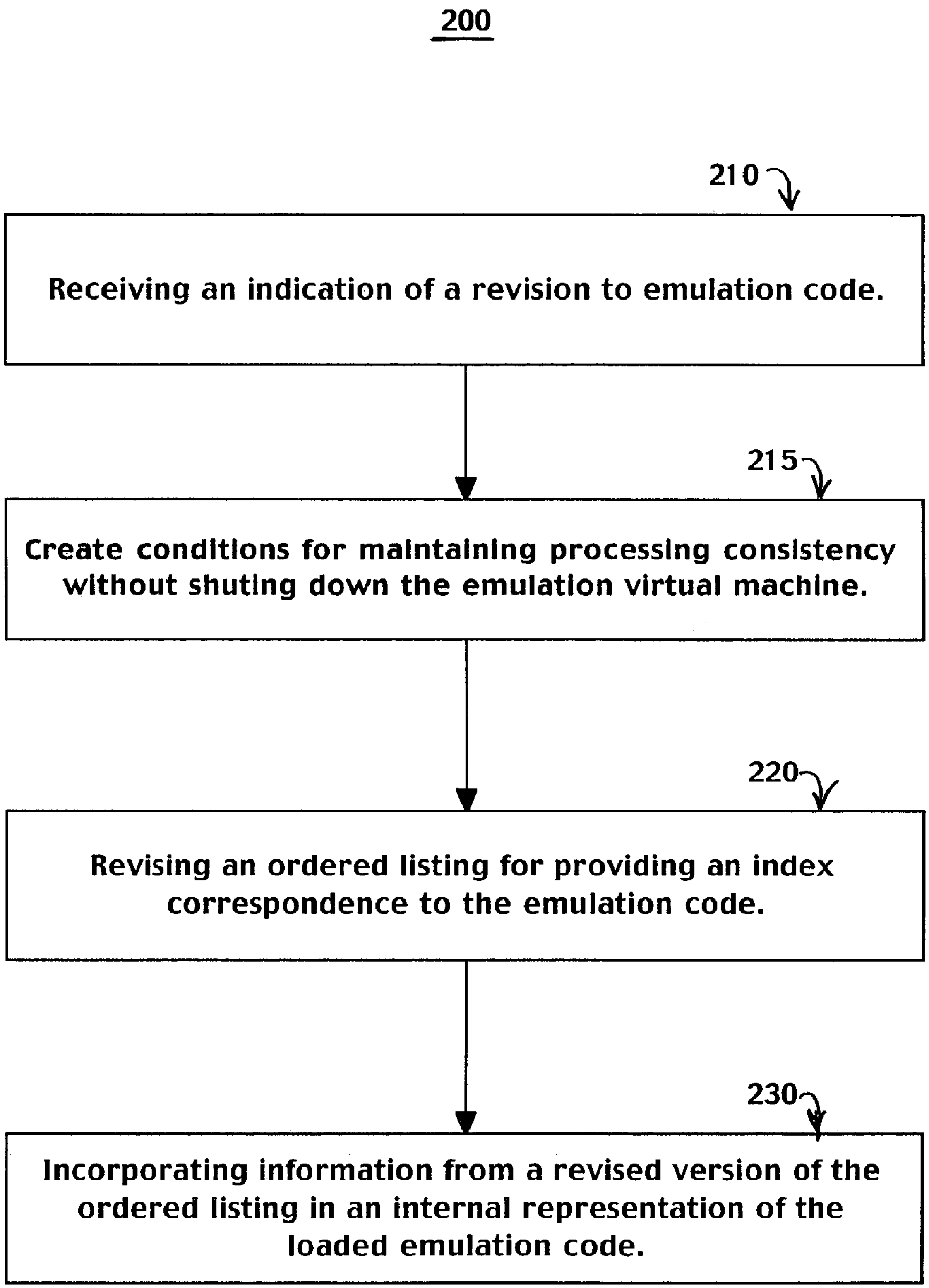

FIG 2

| | | | |
|---|---|---|---|
| Initial Class Offset Indicator 11 | Initial Method Offset Indicator 13 | Initial Const. Offset Indicator 15 | 110 |
| Initial Field Offset Indicator 12 | Initial Code Offset Indicator 14 | | |

| | | | | |
|---|---|---|---|---|
| Class Index Reference 1 | ClassCode Identifier 1A | Initial Field Index Value 1B = (FIR1) | Initial Method Index Value 1C = (MIR1) | 120 |
| Class Index Reference 2 | Class Code Identifier 2A | Initial Field Index Value 2B = (FIR3) | Initial Method Index Value 2C = (MIR 3) | |
| | | | | |
| Field Index Reference 1 | Field Code Identifier 1A | | | 130 |
| Field Index Reference 2 | Field Code Identifier 2A | | | |
| Field Index Reference 3 | Field Code Identifier 3A | | | |
| | | | | |
| | | | | |
| Method Index Reference 1 | Method Code Identifier 1A | Initial Code Offset Value 1B = (MLBC1) | | 140 |
| Method Index Reference 2 | Method Code Identifier 2A | Initial Code Offset Value 2B = (MLBC2) | | |
| Method Index Reference 3 | Method Code Identifier 3A | Initial Code Offset Value 3B = (MLBC3) | | |
| | | | | |

| | |
|---|---|
| Code 1 | 150 |
| Code 2 | |
| Code 3 | |
| | |
| Constant Value 1 | 155 |
| Constant Value 2 | |
| Constant Value 3 | |
| | |
| | |

FIG 5A

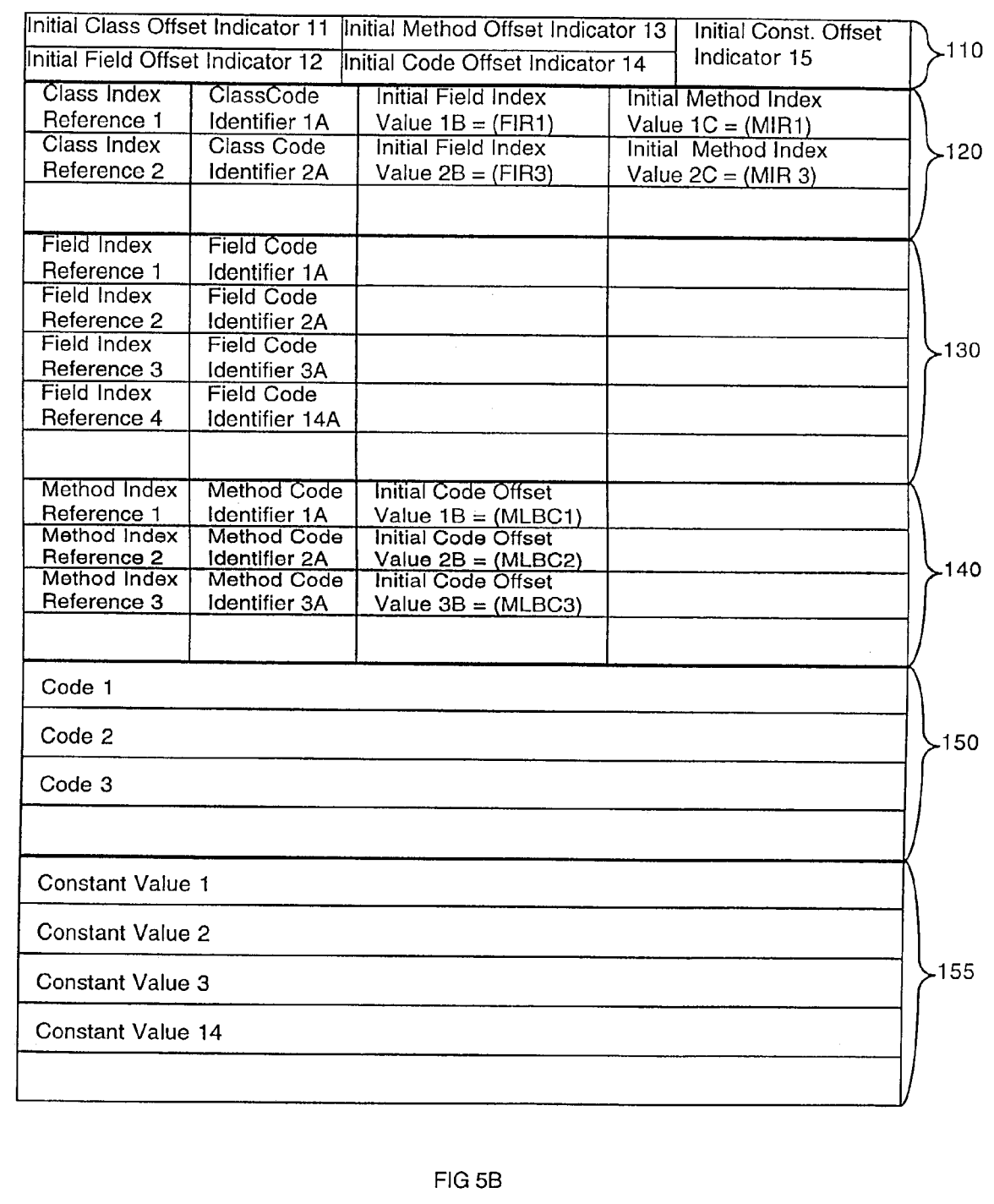

| | | | | |
|---|---|---|---|---|
| Initial Class Offset Indicator 11 | | Initial Method Offset Indicator 13 | Initial Const. Offset Indicator 15 | 110 |
| Initial Field Offset Indicator 12 | | Initial Code Offset Indicator 14 | | |
| Class Index Reference 1 | ClassCode Identifier 1A | Initial Field Index Value 1B = (FIR1) | Initial Method Index Value 1C = (MIR1) | 120 |
| Class Index Reference 2 | Class Code Identifier 2A | Initial Field Index Value 2B = (FIR3) | Initial Method Index Value 2C = (MIR 3) | |
| | | | | |
| Field Index Reference 1 | Field Code Identifier 1A | | | 130 |
| Field Index Reference 2 | Field Code Identifier 2A | | | |
| Field Index Reference 3 | Field Code Identifier 3A | | | |
| Field Index Reference 4 | Field Code Identifier 14A | | | |
| | | | | |
| Method Index Reference 1 | Method Code Identifier 1A | Initial Code Offset Value 1B = (MLBC1) | | 140 |
| Method Index Reference 2 | Method Code Identifier 2A | Initial Code Offset Value 2B = (MLBC2) | | |
| Method Index Reference 3 | Method Code Identifier 3A | Initial Code Offset Value 3B = (MLBC3) | | |
| | | | | |
| Code 1 | | | | 150 |
| Code 2 | | | | |
| Code 3 | | | | |
| | | | | |
| Constant Value 1 | | | | 155 |
| Constant Value 2 | | | | |
| Constant Value 3 | | | | |
| Constant Value 14 | | | | |
| | | | | |

FIG 5B

| | | | |
|---|---|---|---|
| Initial Class Offset Indicator 11 | Initial Method Offset Indicator 13 | Initial Const. Offset Indicator 15 | 110 |
| Initial Field Offset Indicator 12 | Initial Code Offset Indicator 14 | | |

| | | | | |
|---|---|---|---|---|
| Class Index Reference 1 | ClassCode Identifier 1A | Initial Field Index Value 1B = (FIR1) | Initial Method Index Value 1C = (MIR1) | 120 |
| Class Index Reference 2 | Class Code Identifier 2A | Initial Field Index Value 2B = (FIR3) | Initial Method Index Value 2C = (MIR 3) | |
| Class Index Reference 3 | ClassCode Identifier 13A | Initial Field Index Value 13B = (FIR5) | Initial Method Index Value 13C = (MIR4) | |
| Class Index Reference 4 | Class Code Identifier 14A | Initial Field Index Value 14B = (FIR6) | | |
| Field Index Reference 1 | Field Code Identifier 1A | | | 130 |
| Field Index Reference 2 | Field Code Identifier 2A | | | |
| Field Index Reference 3 | Field Code Identifier 3A | | | |
| Field Index Reference 4 | Field Code Identifier 14A | | | |
| Field Index Reference 5 | Field Code Identifier 15A | | | |
| Field Index Reference 6 | Field Code Identifier 16A | | | |
| Method Index Reference 1 | Method Code Identifier 1A | Initial Code Offset Value 1B = (MLBC1) | | 140 |
| Method Index Reference 2 | Method Code Identifier 2A | Initial Code Offset Value 2B = (MLBC2) | | |
| Method Index Reference 3 | Method Code Identifier 3A | Initial Code Offset Value 3B = (MLBC3) | | |
| Method Index Reference 4 | Method Code Identifier 14A | Initial Code Offset Value 14B = (MLBC14) | | |

| | |
|---|---|
| Code 1 | 150 |
| Code 2 | |
| Code 3 | |
| Code 14 | |
| Constant Value 1 | 155 |
| Constant Value 2 | |
| Constant Value 3 | |
| Constant Value 14 | |
| Constant Value 15 | |
| Constant Value 16 | |

FIG 5C

| | | | | | |
|---|---|---|---|---|---|
| Initial Class Offset Indicator 11 | Initial Method Offset Indicator 13 | Initial Const. Offset Indicator 15 | | | 110 |
| Initial Field Offset Indicator 12 | Initial Code Offset Indicator 14 | | | | |
| Class Index Reference 1 | ClassCode Identifier 1A | Initial Field Index Value 1B = (FIR1) | Initial Method Index Value 1C = (MIR1) | | 120 |
| Class Index Reference 2 | Class Code Identifier 2A | Initial Field Index Value 2B = (FIR3) | Initial Method Index Value 2C = (MIR 3) | | |
| Class Index Reference 3 | Class Code Identifier 3A | Initial Field Index Value 3B = (FIR4) | Initial Method Index Value 3C = (MIR4) | Ob ID 199 | |
| Pointer to Class Index Refernence 11 in extended list | | | | | |
| Field Index Reference 1 | Field Code Identifier 1A | | | | 130 |
| Field Index Reference 2 | Field Code Identifier 2A | | | | |
| Field Index Reference 3 | Field Code Identifier 3A | | | | |
| Pointer to Field Index Reference 11 in extended list | | | | | |
| Field Index Reference 4 | Field Code Identifier 4A | | | Ob ID 199 | |
| Field Index Reference 5 | Field Code Identifier 5A | | | Ob ID 199 | |
| Method Index Reference 1 | Method Code Identifier 1A | Initial Code Offset Value 1B = (MLBC1) | | | 140 |
| Method Index Reference 2 | Method Code Identifier 2A | Initial Code Offset Value 2B = (MLBC2) | | | |
| Method Index Reference 3 | Method Code Identifier 3A | Initial Code Offset Value 3B = (MLBC3) | | | |
| Method Index Reference 4 | Method Code Identifier 4A | Initial Code Offset Value 4B = (MLBC4) | | Ob ID 199 | |
| Code 1 | | | | | 150 |
| Code 2 | | | | | |
| Code 3 | | | | | |
| Code 4 | | | | ObID199 | |
| Constant Value 1 | | | | | 155 |
| Constant Value 2 | | | | | |
| Constant Value 3 | | | | | |
| Constant Value 4 | | | | ObID199 | |
| Constant Value 5 | | | | ObID199 | |
| Extended List Header Section 110E | | | | | 190 |
| Extended List Class Name section 120E | | | | | |
| Extended List Field Section 130E | | | | | |
| Extended List Method Section 140E | | | | | |
| Extended List Code Section 150E | | | | | |
| Extended List Constant Section 155 | | | | | |

FIG 5D

EMULATION INTERNAL REPRESENTATION REVISION SYSTEM AND METHOD

FIELD OF THE INVENTION

The present invention relates to programming devices. More particularly, the present invention relates to revising or updating emulation class (e.g., JAVA™ class) information.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating information in most areas of business, science, education and entertainment. Systems providing these advantageous results often involve emulation of a virtual "machine" for processing information. Emulation application information that directs processing activities is typically very large and is often revised or updated for a variety of reasons. However, storing and communicating large amounts of emulation application information requires significant resources. Furthermore, revising and updating existing emulation application information can be difficult and are often problematic.

Numerous electronic devices include processors that operate by executing programs comprising a series of instructions. These programs and their series of instructions are typically referred to as software. Software instructions include directions that guide processor device functions in the performance of useful tasks. The software code is often expressed in different configurations or languages. Some software is expressed in an emulation language and runs on a virtual machine. JAVA is one example of a high level emulation language that offers significant advantages. JAVA characteristics of platform independence, security, and network mobility make it particularly suitable for emerging distributed network computing environments. While JAVA applications can provide significant advantages, storing, communicating and revising or updating a JAVA application information can consume significant resources.

Emulation applications are typically object oriented programs and often include code segments that are large. The code segments usually include bytecode and data (e.g., configured in class definitions). The bytecode designators (e.g., class names, method names, field names, operands, constants, etc.) are usually long textual strings comprising numerous characters and often duplicative. This usually results in a requirement for numerous bits to express or represent the information. The larger the number of bits that are communicated, processed and/or stored the greater the resources required. Communicating larger number of bits often requires increased network infrastructure to achieve desirable bandwidth and/or network resource are used or occupied (e.g., "consumed" in the sense that they are unavailable for other activities) for a longer duration. Processing the information also usually requires more resources dedicated to processing activities (e.g., larger registers for storing bytecode designators). Finally, storing larger number of bits usually involves resources committed to memories (e.g., a greater number of memory cells for the additional bits). In addition to requiring more resources the longer code also usually entails longer access and execution times that slow performance down.

It is also traditionally difficult to maintain data consistency when revising emulation code. One traditional approach to attempt data consistency or coherency is to shut down an emulation virtual machine before a revision or update to emulation application information is made. For example, JAVA virtual machines are shut down before the new classes (e.g., revised classes) are reloaded in place of the old ones. This usually requires the entire application to be loaded again and processing started over. This is particularly inconvenient if the emulation virtual machine has been running an application for a relatively long period of time. The relative nature of the time between revisions is usually determined based upon the application. For example, if an application performs numerous operations in a second, several minutes can be a relatively long lived application with respect to application processing. If the emulation virtual machine has been running for a while there can be a significant number of application threads that involve information "reprocessing".

Further complicating the revision of traditional emulation code is the relatively large number of bits that may require alteration in a change. Since the number of bits used to internally express or represent traditional emulation code and constants are usually large, the number of bits that require alteration to change traditional emulation internal representation information is also usually large. In addition, the typically high incidence of duplicated code and/or lengthy code strings further exacerbates the problem.

SUMMARY OF THE INVENTION

A present invention emulation internal representation revision method performs revisions on internal representations. In one embodiment of the present invention, an indication of a revision to loaded emulation code is received. Conditions for maintaining consistency are created. An ordered listing for providing an index correspondence to the emulation code is revised. The information from the listing is incorporated in an internal representation of the emulation code, such that a virtual machine implementing the loaded emulation code is not shut down.

BRIEF DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

FIG. 1B is a tabular representation of an exemplary ordered listing in accordance with one embodiment of a present invention populated for a particular JAVA application.

FIG. 2 is a flow chart of an emulation internal representation revision method in accordance with one embodiment of the present invention.

FIG. 5A shows an exemplary implementation of deleting a class code identifier.

FIG. 5B shows an exemplary implementation of adding a field code identifier to a class code identifier.

FIG. 5C shows an exemplary implementation of adding new class code identifiers, in accordance one embodiment of the present invention.

FIG. 5D is an illustration of implementing changes in ordered listing in accordance with one embodiment of the present invention without regenerating the listing.

DETAILED DESCRIPTION OF THE INVENTION

Figure 1A:
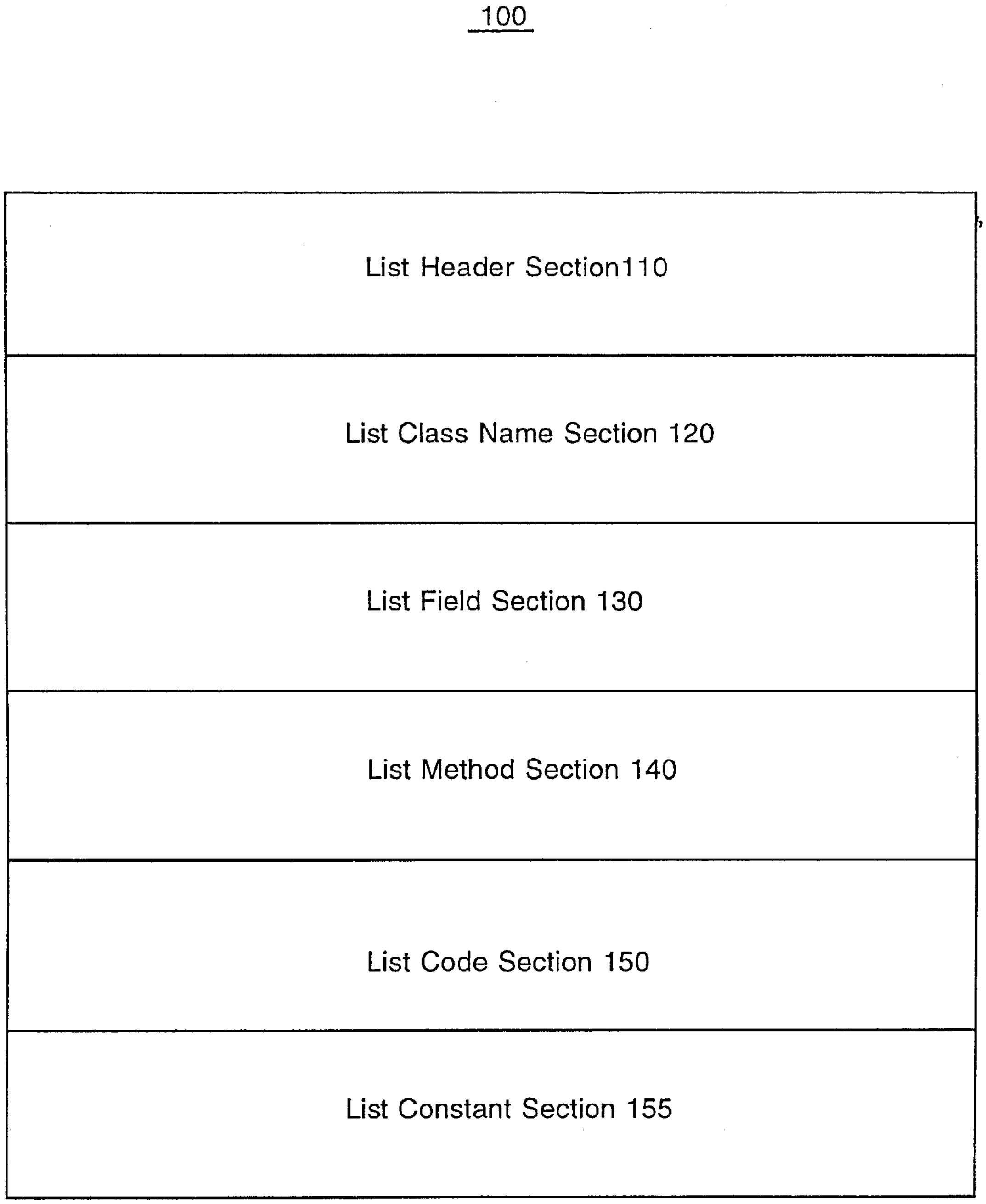
FIG. 1A is block diagram of an exemplary ordered listing in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood the present invention may be practiced without these specific details. In other instances, some readily understood methods, procedures, components, and circuits have not been described in detail as not to unnecessarily obscure aspects of the current invention.

Some portions of the detailed descriptions that follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here generally conceived to be a sequence of steps or instructions that guide operations of a system to a desired result. The steps include physical manipulations of physical quantities. Usually, though not necessarily, these quantities take the form of electrical, magnetic, optical, or quantum signals capable of being stored, transferred, combined, compared, and otherwise manipulated in a processing system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as “processing”, “computing”, “calculating”, “determining”, “displaying” or the like, refer to the action and processes of a computer system, or similar processing device (e.g., an electrical, optical, or quantum computing device), that manipulates and transforms data represented as physical (e.g., electronic) quantities. The terms refer to actions and processes of the processing devices that manipulate or transform physical quantities within a system’s components (e.g., registers, memories, other such information storage, transmission or display devices, etc.) into other data similarly represented as physical quantities within the same or other components.

The present invention facilitates robust dynamic revision of condensed emulation application information. The present invention ensures that information consistency is maintained during emulation application information revision. In one embodiment, the present invention emulation application information revision system and method facilitates dynamic revision (e.g., updating) of JAVA class definitions. The revision is performed in a manner that maintains processing information results and permits resumption of processing at a consistent state when the revision is initiated.

In one embodiment of the present invention, class information is expressed in index values associated with an ordered listing (e.g., a canonical list) that establishes a correlation between emulation code structure identifiers (e.g., JAVA classes, methods, fields, etc.) and the index values. The ordered listing comprises code structure identifiers (e.g., code structure identifiers initially established as a result of source code compiling) sorted in a sequential arrangement and mapped to index values. In one exemplary implementation, bytecode is condensed by replacing code structure identifiers included in the bytecode with corresponding index references. In one embodiment, the condensed bytecode can be interpreted and executed when expressed with index values without the ordered lists.

FIG. 1A is block diagram of exemplary ordered listing 100 in accordance with one embodiment of the present invention. In one embodiment of the present invention, ordered listing 100 is a canonical indexing of code structure identifiers. Ordered listing 100 provides a correlation or correspondence between an index reference and a code structure identifier (e.g., a class name, a variable name, method name, etc.), code, and/or a constant value. Ordered listing 100 comprises a header section 110, a list class section 120, a list field section 130, a list method section 140, a list code section 150 and a list constant section 155. Header section 110 tracks order listing header information including offset information indicating an offset to the location of the beginning of each respective section. List class section 120 provides a correlation between class code identifiers and class index references and tracks information indicating the initial field index values and initial method index values for fields and methods associated with class code identifiers. List field class section 130 provides a correlation between field code identifiers and field index references and tracks information indicating the offset to an initial location for constant values associated with field code identifiers. List method class section 140 provides a correlation between method code identifiers and method index references and tracks information indicating offset to an initial location of code associated with method code identifiers. List code section 150 tracks code associated with methods. List constant section 155 tracks constant values associated with classes.

FIG. 1B is a tabular representation of exemplary ordered listing 100, one embodiment of a present invention ordered listing populated for a particular JAVA application. Class code identifiers, field code identifiers and method code identifiers can be class name indexes, field name indexes and method name indexes respectively. The JAVA application comprises class code identifiers 1A, 2A and 3A. The definition of the class associated with class code identifier 1A includes field code identifier 1A, field code identifier 2A, method code identifier 1A and method code identifier 2A. The definition of the class associated with class code identifier 2A includes field code identifier 3A, and method code identifier 3A. The definition of the class associated with class code identifier 3A includes field code identifier 4A, field code identifier 5A, and method code identifier 4A.

The information included in header 110 provides an indication of the beginning of each respective section. For example, header 110 includes an initial class offset indicator 11, initial field offset indicator 12, initial method offset indicator 13, initial code offset indicator 14 and initial constant offset indicator 15. Initial class offset indicator 11 indicates an offset to the location (e.g., a memory location) of the initial class (e.g., the offset of class index reference 1) in list class section 120. Initial field offset indicator 12 indicates an offset to the location of the initial field (e.g., the offset of field index reference 1) in list field section 130. Initial method offset indicator 13 indicates an offset to the location (e.g., memory location) of the initial method (e.g., the offset of method index reference 1) in list method section 140. Initial code offset indicator 14 indicates an offset to a location of the initial code (e.g., the offset of code 1) in list code section 150. Initial constant offset indicator 15 indicates an offset to the location (e.g., memory location) of the initial constant (e.g., the offset of constant 6) in list constant section 155.

With continued reference to FIG. 1B, the ordered listing provides a correlation between class code identifiers 1A through 3A and class index references 1 through 3 respectively, field code identifiers 1A through 5A and field index references 1 through 5 respectively, and method code identifiers 1A through 4A and method index references 1 through 4 respectively. The ordered listing 100 also provides an association between class index references 1 through 3 and initial field index values 1B through 3B and initial method index values 1C through 3C respectively. Initial field index values 1B through 3B identify the first field associated with the class and initial method index values 1C through 3C identify the method associated with the class. For example, since the definition of the class associated with class code identifier 2A includes field code identifier 3A and method code identifier 3A, class ordered listing 100 provides an association between class index reference 2 and field index reference 3 by setting initial field index value 2B equal to 3. Class ordered listing 100 also provides an association between class index reference 2 and method index reference 3 by setting initial method index value 1C equal to 3.

The ordered listing also provides correlation from field and methods to constant values and code respectively. Constant values 1 through 5 include constant "type" information associated with the classes. In addition, ordered listing 100 also provides an association between method index references 1 through 4 and initial code offset values 1B through 4B by setting initial code offset values 1B through 4B equal to the memory location of the start of code values 1 through 4 respectively. Codes 1 through 4 include code information associated with the classes.

Figure 1C:
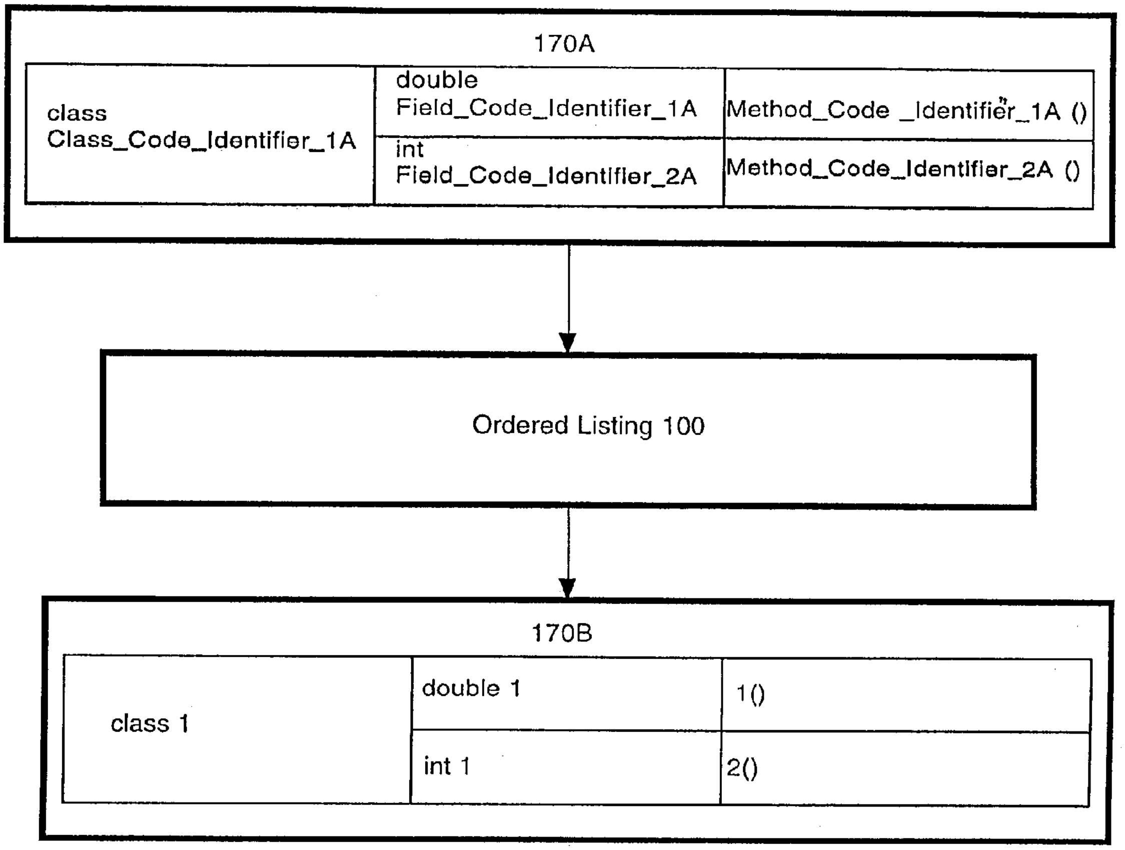
FIG. 1C is a block diagram illustration of condensed code transformation in accordance with one embodiment of the present invention.

FIG. 1C is a block diagram illustration of condensing code in accordance with one embodiment of the present invention. Code segment 170A is one exemplary block diagram representation of an emulation class definition expressed in an emulation language and comprises:

```
Class Class__code__identifier__1A
{
Method__code__identifier__1A ( );
Method__code__identifier__2A ( ):
double Variable__ code__identifier__1A;
int Variable__ code__identifier__2A;
}.
```

Each of the code structure identifiers are replaced with index identifiers to produce the block diagram exemplary condensed emulation class segment 170B expressed as follows:

```
Class 1
{
1( );
2( );
double 1;
int 2;
}.
```

Thus, the number of bits included in the condensed emulation class expression is smaller than the emulation language format.

One embodiment of a present invention ordered listing generation system and process for generating a canonical list (e.g., ordered listing 100) is described in U.S. Pat. No. 6,163,780 entitled "System and Apparatus for Condensing Executable Computer Software Code", filed Apr. 1, 1998, which is incorporated herein by reference.

FIG. 2 is a flow chart of emulation internal representation revision method 200, an emulation internal representation revision method in accordance with one embodiment of the present invention. Emulation internal representation revision method 200 facilitates dynamic revision of condensed emulation class information (e.g., "on the fly"). In one exemplary implementation, instructions for performing emulation internal representation revision method 200 are stored in a computer readable medium (e.g., a computer readable memory, disk, etc.). It is appreciated that emulation internal representation revision method 200 can be implemented on a variety of hardware configurations, including a computer system (e.g., computer system 650), an embedded system and/or on a network (e.g., network 700).

In step 210, an indication of a revision to loaded emulation code (e.g., JAVA bytecode) is received. In one embodiment of the present invention, an emulation class revision is downloaded from an external source (e.g., the Internet) and a signal indicating initiation of an emulation application revision is sent to an emulation virtual machine (e.g., a JAVA virtual machine). For example, a JAVA virtual machine receives an event signal indicating a JAVA class attempting to load on the JAVA virtual machine has a revision. The downloaded emulation class revision can be expressed in order list index values.

In step 215, conditions for maintaining consistency are created. The consistency is maintained through the revision to the loaded emulation code without shutting down the emulation virtual machine. In one embodiment of the present invention, emulation virtual machine processing is paused. For example, the emulation virtual machine checks if an emulation class associated with the emulation class revision currently involved in a processing pipeline operation being performed by the emulation virtual machine. If a processing pipeline operation is already initiated, the emulation virtual machine permits that processing cycle to complete. However, the emulation virtual machine prevents processing pipeline operations from being initiated (e.g., fetched) by the emulation virtual machine on the classes associated with the class revision. For example, the emulation virtual machine does not permit processing pipeline fetch operations to commence while completing other processing pipeline operations (e.g., decode, execute, write, etc.).

In one embodiment, execution processing for other classes not associated with the emulation class revision are permitted to be initiated and completed. For example, the emulation virtual machine permits processing pipeline operations to commence (e.g., including fetch, decode, execute, etc.) for other processing pipeline operations not impacted by the revisions. Once the processing pipeline is empty (e.g., the other processing pipeline operations are completed), the emulation virtual machine proceeds to step 220.

In step 220 an ordered listing for providing an index correspondence to the emulation code is revised. In one embodiment of the present invention, an offset indicator associated with the ordered listing is adjusted to correspond with the revision to the emulation code. In one exemplary implementation, the offset corresponds to a byte boundary of bytecode associated with the emulation code. For example, the offset corresponds to a memory location (address indicator etc).

In one embodiment, revising the ordered listing includes determining if the revision to the emulation code includes an addition or deletion of a code structure identifier in the emulation code, and making a corresponding adjustment to the listing of index references. The corresponding adjustment to the listing of index references can include adding an index reference to correspond to an addition of a code structure identifier. For example, a list revision extension section 190 that provides ordered listing correspondence between index references and additional revision information (e.g., class code identifiers, field code identifiers, method code identifiers, code, constant values, etc.) can be appended to the ordered listing. The corresponding adjustment to the listing of index references can include removing an index reference to correspond to a deletion of a code structure identifier. Alternatively, the corresponding adjustment to the listing of index references can include marking an index reference as obsolete.

The offsets of the index references can be adjusted to compensate for continued ordered listing of the code structure identifiers after removal of the index reference. For example, if the location initial index references in a list section changes (e.g., a change in the memory location of field index reference 1 which is the initial index reference in list field section 130), the initial field offset indicator 12 value is changed to match the new location of field index reference 1. In addition, the initial index values for each class can be adjusted to match revisions. For example, if the ordered list is regenerated, an initial field index (e.g., initial field index value 3B) and an initial method index value (e.g., initial index value 3C) associated with the class can be altered if the location of the initial field index value and the initial method index value changes.

In one embodiment of the present invention, performing the emulation class revision includes resolving corresponding dependency changes related to the emulation class revision. In one exemplary implementation, resolving corresponding dependency changes comprises ascertaining which classes have a dependency relationship to emulation classes being changed. Appropriate changes are determined for the classes which have a dependency relationship. Corresponding changes are implemented in the classes with a dependency relationship. For example, if a first class (e.g., class A) initially has a reference to a second class (e.g., class B) and the second class definition is deleted by the revision, the present invention can delete the reference to the second class from the first class even though the revision information did not explicitly include instructions to delete the subclass reference from the superclass. Additionally, if a superclass is deleted the corresponding subclasses are deleted and appropriate changes are made even though the revision information did not explicitly include instructions to delete the reference to the superclass from the subclass.

In step 230, information from a revised version of the ordered listing is incorporated in an internal representation of the loaded emulation code. In one embodiment, emulation application processing continues including the revised ordered index information. Shutting down the emulation virtual machine is not required since conditions for maintaining consistency are created in step 215. In one embodiment of the present invention, the current internal representations of the emulation application revisions are "flashed".

Figure 3:
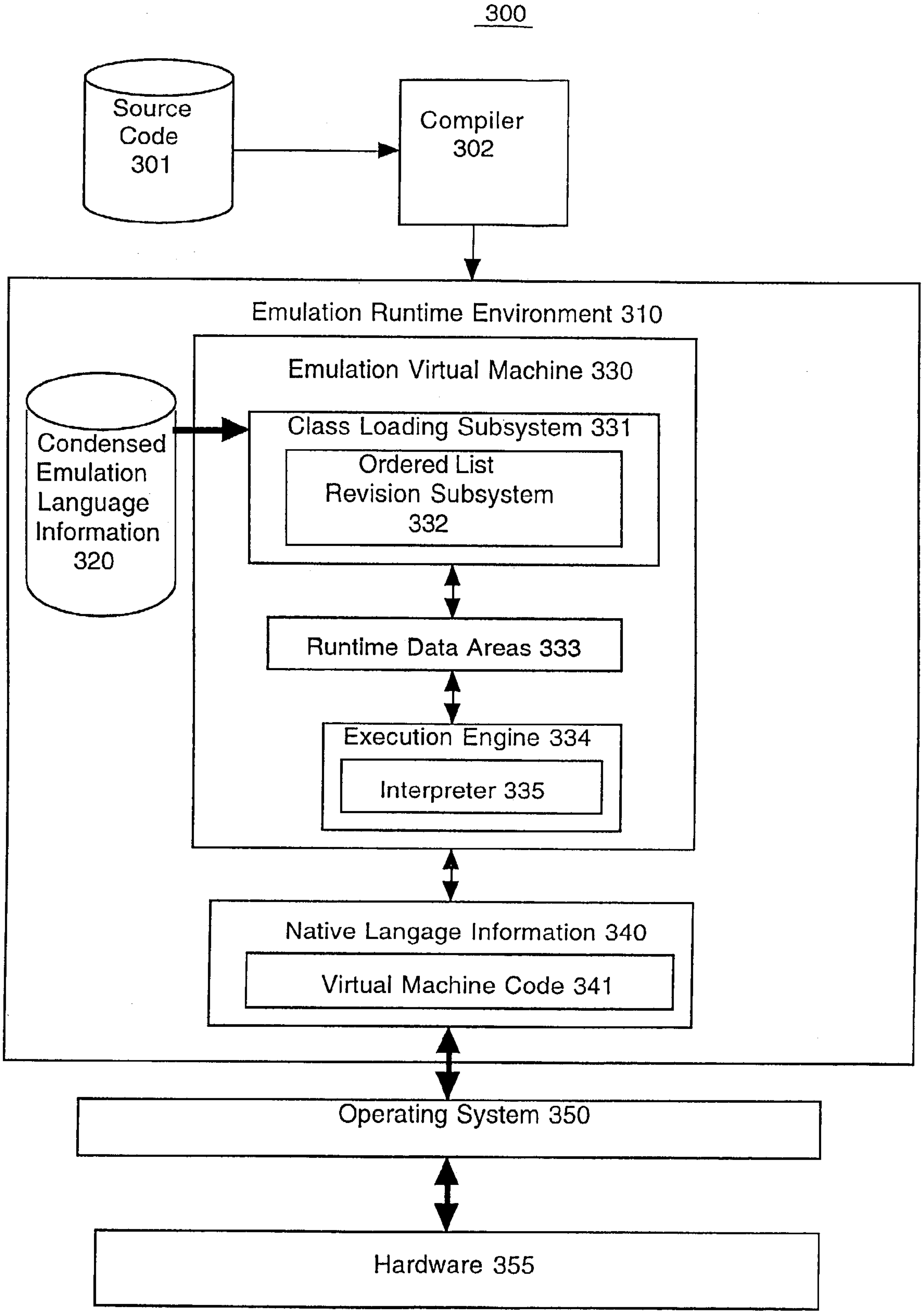
FIG. 3 is a block diagram representation of one embodiment of a present invention emulation internal representation revision architecture.

FIG. 3 is a block diagram representation of a present invention emulation internal representation revision system and architecture 300 in accordance with one embodiment of the present invention. In one exemplary implementation, emulation application revision architecture 300 emulates a JAVA compatible architecture (e.g., compatible with JAVA virtual machine specification, JAVA language compatible, JAVA bytecode compatible, etc.). Emulation application system 300 comprises source code 301, compiler 302, emulation application runtime environment 310, operating system 350 and hardware 355. The components of emulation application revision architecture 300 cooperatively operate to run an emulation application (e.g., a JAVA application) including dynamic revision of emulation application information (e.g., "on the fly").

Source code 301 includes application instructions associated with an emulation application (e.g., a JAVA application). Emulation compiler 302 compiles or translates source code 301 into byte code and/or object code that is utilized in emulation application revision runtime environment 310. Emulation application revision runtime environment 310 emulates a processing platform (or "machine") for performing emulation program instructions including revising emulation application information for execution on operating system 350 and hardware 355. Operating system 350 controls the utilization of hardware 355. Hardware 355 includes physical components that perform information manipulations specified by emulation application revision runtime environment 310.

In one embodiment of the present invention, emulation verification runtime environment 310 includes emulation language class information 320 (e.g., JAVA class information), emulation revision virtual machine 330 (e.g., a JAVA virtual machine with present invention emulation application information revision capabilities) and native language information 340. Emulation revision virtual machine 330 provides a platform-independent instruction execution "mechanism" for abstracting and coordinating operating system and processor instructions in a manner that provides emulation processing and dynamic revision of emulation application information. In one embodiment, emulation language class information 320 includes bytecodes (e.g., code capable of running on multiple platforms) that provide instructions and data for execution and processing by emulation revision virtual machine 330. In one exemplary implementation, emulation class information 320 includes emulation application revision information. Native language information 340 includes native language instructions that are passed by emulation revision virtual machine 330 to operating system 350 and hardware 355.

In reference still to FIG. 3, emulation revision virtual machine 330 comprises class loading subsystem 331, runtime data area 333 and execution engine 334 in one embodiment. Emulation revision virtual machine 330 is able to execute condensed emulation information and can use a variety of techniques to execute bytecodes in software and/or varying degrees of hardware. For example, computer readable program code for causing a computer system to implement an emulation virtual machine with dynamic class information revision in accordance with one embodiment of the present invention can be embodied on a computer usable storage medium. Class loading subsystem 331 loads emulation language class information 320 (e.g., JAVA bytecode information), including emulation application revision information (e.g., revised JAVA bytecode information). Runtime data area 333 defines and tracks assignment of logical memory locations associated with executing methods and processing data of loaded classes. Execution engine 334 (e.g., an execution module) provides a "mechanism" for executing instructions and processing data included in the condensed information of loaded classes.

Class loading subsystem 331 places condensed emulation application revision information into memory (e.g., runtime data area 333) for processing. In one embodiment of the present invention, class loading subsystem 331 includes a revision loading subsystem 332 that dynamically loads emulation application revision information on emulation verification virtual machine 330. In one exemplary implementation of the present invention, revision loading subsystem 331 includes a plurality of class loaders configured in a flexible call loader architecture that permits a JAVA application to load classes in a customized manner. When the class data and instructions are loaded, revision loading subsystem 331 transfers control for processing and execution of the data and instructions to runtime data area 333 and execution engine 334.

Runtime data area 333 can be flexibly adapted for a variety of different memory constraints. In one embodiment, each instance of emulation virtual machine 330 has a method area and a heap area which can be shared by multiple threads running inside the emulation virtual machine 330. When emulation virtual machine 330 loads class file information, it parses type information from the binary data contained in the class file and places this type information into a method location of runtime data area 333. As an emulation language program (e.g., JAVA program) proceeds, emulation virtual machine 330 places objects the emulation language program instantiates onto a heap location of runtime data area 333. Runtime data area 333 can include a stack area (e.g., a JAVA stack, a native language stack, etc.) which stores the state of method invocations. Runtime data area 333 can also include a program counter "register" area for indicating the next instruction of the emulation language program to execute.

Referring still to the exemplary illustration of FIG. 3, execution engine 334 executes condensed emulation instructions included in emulation class information 320. In one exemplary implementation, condensed emulation instructions include an offset value that directs the execution engine to a memory location storing opcode that indicates the operation to be performed. The condensed emulation instruction can include an operand that provides information associated with the operation. Execution engine 334 fetches an opcode and related information (e.g., operands and/or data stored in other areas) and performs the instructions indicated by the opcode. In one embodiment of the present invention, execution engine 334 includes an interpreter 335. Interpreter 335 interprets the condensed emulation code information and retrieves native language information (e.g., native language instructions). The interpreted condensed emulation code activity can be monitored and more heavily utilized bytecodes can be adaptively optimized. In one exemplary implementation, execution engine 334 interprets the condensed emulation information one instruction at a time. In an another exemplary implementation, a just-in-time compiler compiles the condensed emulation information into a native language machine code the first time a method is invoked and stores the native language machine code in cache, permitting faster execution and thereby mitigating some performance detractions (e.g., slower processing) otherwise associated with virtual machines.

Figure 4:
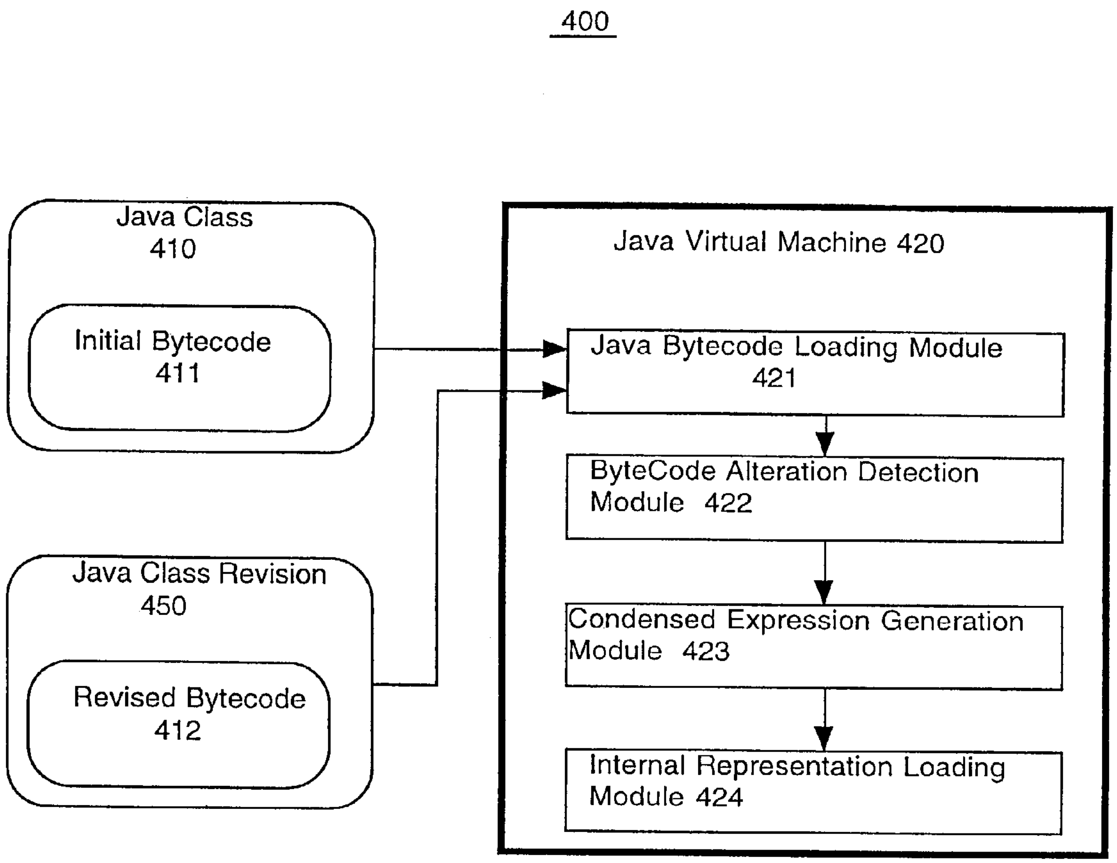
FIG. 4 is a block diagram of a JAVA emulation revision system in accordance with one embodiment of the present invention.

FIG. 4 is a block diagram of JAVA emulation revision system 400, one embodiment of the present invention. JAVA emulation revision system 400 is JAVA compatible. In one embodiment of the present invention, instructions for causing a computer system to implement a dynamic emulation class internal representation revision by JAVA emulation revision system 400 are stored and embodied on a computer usable storage medium (e.g., as computer readable code). JAVA emulation revision system 400 includes JAVA class bytecode 410, JAVA revision class 450 and JAVA virtual machine 420. JAVA class bytecode 410 comprises initial bytecode 411 and JAVA revision class 450 includes bytecode 412. JAVA virtual machine 420 includes JAVA bytecode loading module 421, bytecode modification detection module 422, and condensed expression generation module 423.

In one embodiment of the present invention, initial bytecode 411 and revised bytecode 412 are code segments. The bytecode can define objects which are instances of a class (e.g., "component" characteristics or features included in the class). The JAVA class definitions can include fields and methods. The fields or class variables ("variables") can include data (e.g., integers or characters) which can be private data accessible by a single class or public data accessible by a plurality of classes. The data can also be characterized as static data associated with class objects as a whole (e.g., common to each instance of the class) or dynamic data associated with class objects individually. The methods perform tasks or functions (e.g., a subroutine). The methods can also call other methods via invocations and/or can pass data to other objects.

With continued reference to FIG. 4, the components of JAVA emulation revision system 400 cooperatively operate to provide revised updates to condensed expressions of JAVA class internal representations. Initial bytecode 411 provides initial JAVA class bytecode information. Revised bytecode 412 includes revisions to initial bytecode 411. JAVA bytecode loading module 421 loads bytecode information (e.g., initial bytecode 411 and revised bytecode 412)

onto JAVA virtual machine 420, including revisions or modifications to bytecode being processed by JAVA virtual machine 420. Bytecode modification detection module 422 determines if the bytecode loaded by JAVA bytecode loading module 421 includes revisions or modifications to bytecode being processed by JAVA virtual machine 420. If the bytecode does include a revision, bytecode modification detection module 422 pauses emulation application operations at a reliable state for making revisions or modifications. A reliable state enables the JAVA virtual machine to maintain consistency between results generated before and after class revision changes are implemented. In one embodiment, bytecode alteration detection module 422 does not allow instructions from emulation applications that include revised class information to enter the JAVA virtual machine pipeline. Bytecode alteration detection module 422 also analyzes the revisions or alterations to classes and provides condensed expression generation module 423 with an indication of the changes. Condensed expression generation module 423 generates a condensed internal expression of the loaded bytecode with adjustments in offsets to compensate for the modifications. The condensed expression is internally loaded by internal representation loading module 424.

In one exemplary implementation, detection component 422 includes a related information analysis module (not shown). The related information analysis module ascertains if related emulation application information is impacted by the altered emulation class information and makes corresponding alterations to the related emulation application information. For example, the related information analysis module determines if the revisions implemented by JAVA virtual machine 420 are involved in dependency relationships. If there is involvement with a dependency relationship, the related information analysis module makes appropriate changes to other classes (e.g., also involved in the dependency relationship) to maintain the dependency relationships. The corresponding changes or alterations can include changing dependency information included in the related emulation application information (e.g., a JAVA class with a superclass or subclass relationship to a revised JAVA class).

FIGS. 5A through 5C are illustrations of one exemplary implementation of changes to ordered listing 100 in accordance with the present invention. In one exemplary implementation of the present invention, a revision deletes class code identifier 3A, adds a field code identifier 14A to the definition of class code identifier 2A, adds a new class definitions associated with class code identifier 13A, and adds a new class definitions associated with class code identifier 14A. The definition for class code identifier 13A includes field code identifier 15A and method code identifier 14A. The definition for class code identifier 14A includes field code identifier 16A.

FIG. 5A shows one exemplary implementation of deleting class code identifier 3A. In one embodiment, deleting a class also means that the corresponding fields, methods, code and constants are no longer utilized and thus also deleted automatically by the present invention. For example field code identifiers 4A and 5A, method code identifier 4A, code 4 and constant values 4 and 5 are deleted. In one exemplary implementation, the corresponding class index reference 3, field index reference 4 and 5 and method index reference 4 are also deleted.

FIG. 5B shows an implementation of adding a field code identifier 14A to class code identifier 2A. Field code identifier 14A is inserted in the canonical ordered list below field code identifier 3A since field code identifier 3A is the initial field code for class code 2A. A correlation between field code identifier 14A and field index reference 4 is established and reference is provided to indicate the initial constant offset 14B is set to the initial memory location of constant value 14 (MLCV14).

FIG. 5C shows an implementation of adding new class code identifiers 13A and 14A. The definition of the class associated with class code identifier 13A includes field code identifier 15A and method code identifier 14A. A correlation between class code identifier 13A and class index reference 3 is established. Reference is provided to indicate the initial field index value 13B is set to field index reference 5 (FIR5) and a reference also indicates the initial method index value 13C is set to method index reference 4 (MIR4). A correlation between field code identifier 15A and field index reference 5 is established. Reference is provided to indicate the initial constant offset 15B is set to the initial memory location of constant value 15 (MLCV15) and a reference also indicates the initial code offset 14B is set to the initial memory location of code 14 (MLBC14).

The definition of the class associated with class code identifier 14A includes field code identifier 16A which is associated with constant value 16. A correlation between class code identifier 14A and class index reference 4 is established. Reference is provided to indicate the initial field index value 14B is set to field index reference 6 (FIR6). A correlation between field code identifier 16A and field index reference 6 is established and a reference is provided to indicate the initial constant offset 16B is set to the initial memory location of constant value 16 (MLCV16).

In an alternate embodiment of the present invention, ordered listing 100 is not regenerated when code is changed. Rather deleted items are marked as obsolete and additional items are include in an extended list. FIG. 5D is an illustration of implementing changes in ordered listing 100 in accordance with one embodiment of the present invention without regenerating the listing. List revision extension section 190 includes extended list header section 110E, extended list class name section 120E, extended list field section 130E, extended list method section 140E, extended list code section 150E and extended list constant section 155. The extended list sections perform similar corresponding operations as the original list.

Extended header section 110E tracks order listing header information including offset information indicating an offset to the location of the beginning of each respective extended list section 120E, 130E, 140E, 150E and 155E. Extended list class section 120E provides a correlation between new class code identifiers and class index references and tracks information indicating the initial field index values and initial method index values for new fields and new methods associated with the new class code identifiers. Extended list field class section 130E provides a correlation between new field code identifiers and field index references and tracks information indicating the offset to an initial location for new constant values associated with the new field code identifiers. Extended list method class section 140E provides a correlation between new method code identifiers and method index references and tracks information indicating offset to an initial location of new code associated with the new method code identifiers. Extended list code section 150E tracks code associated with new methods. Extended list constant section 155 tracks new constant values associated with the current class.

In one embodiment of the present invention, deleted classes are marked as obsolete. For example, class index reference 3 associated with deleted class code identifier 3A is marked as obsolete (e.g., by obsolete identifier 199). Field index reference 4 and 5, method index reference 4, code 4, and constant values 4 and 5 are also marked as obsolete.

Figure 5E:
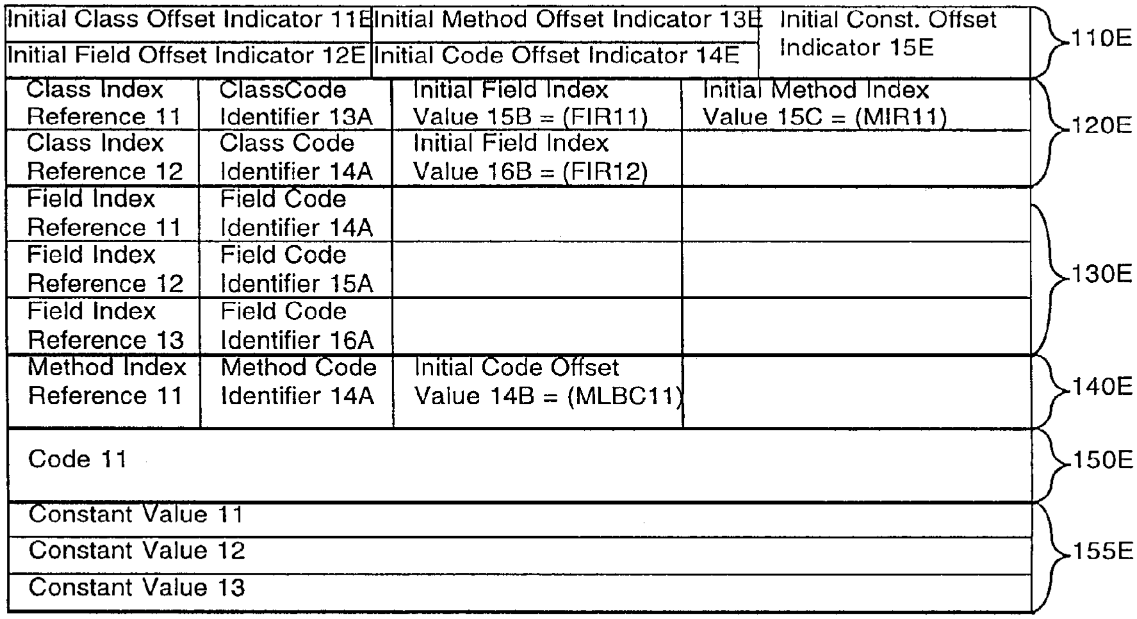
FIG. 5E illustrates one exemplary implementation of the changes included in an extended list section in accordance with one embodiment of the present invention.

FIG. 5E illustrates one exemplary implementation of the changes included in extended list section 190. The extended list class section 120E provides a correlation between class code identifiers 13A through 14A and class index references 11 through 12 respectively, field code identifiers 14A through 16A and field index references 11 through 13 respectively, and method code identifier 14A and method index references 11. The ordered listing 100 also provides an association between class index references 11 through 12 and initial field index values 15B through 16B and initial method index values 15C respectively. The ordered listing also provides correlation from class to constant values respectively. In addition, the extended list method section 140E also provides an association between method index references Hand code offset value 11 by setting initial code offset values 14B equal to the memory location of the start of code value 11.

In one embodiment of the present invention, changes to code and constant values are performed in a manner to simplify making offset adjustments to a revision. In one exemplary implementation, if codes or constant values (e.g., constant value 2) includes less information after a revision, the space between the end of the revised constant value and a second following constant value can be overwritten with filler thereby maintaining the offset value of the second following constant. For example, if information included in constant value 2 is deleted, filler is added from the end of the revised constant value 2 to the beginning of constant value 3, thereby maintaining the offset and location of constant value 3. If code or constant values have additional information, original index reference can be marked as obsolete and revision information added by including the revised version in the extended revision list section 190 under an extended list index reference. For example, if information is added to constant value 2, the constant value 2 can be marked as obsolete and a pointer is inserted to point to an new index reference (not shown) in the extended list field section 130E where the revised version of the constant value 2 is added.

Figure 6:
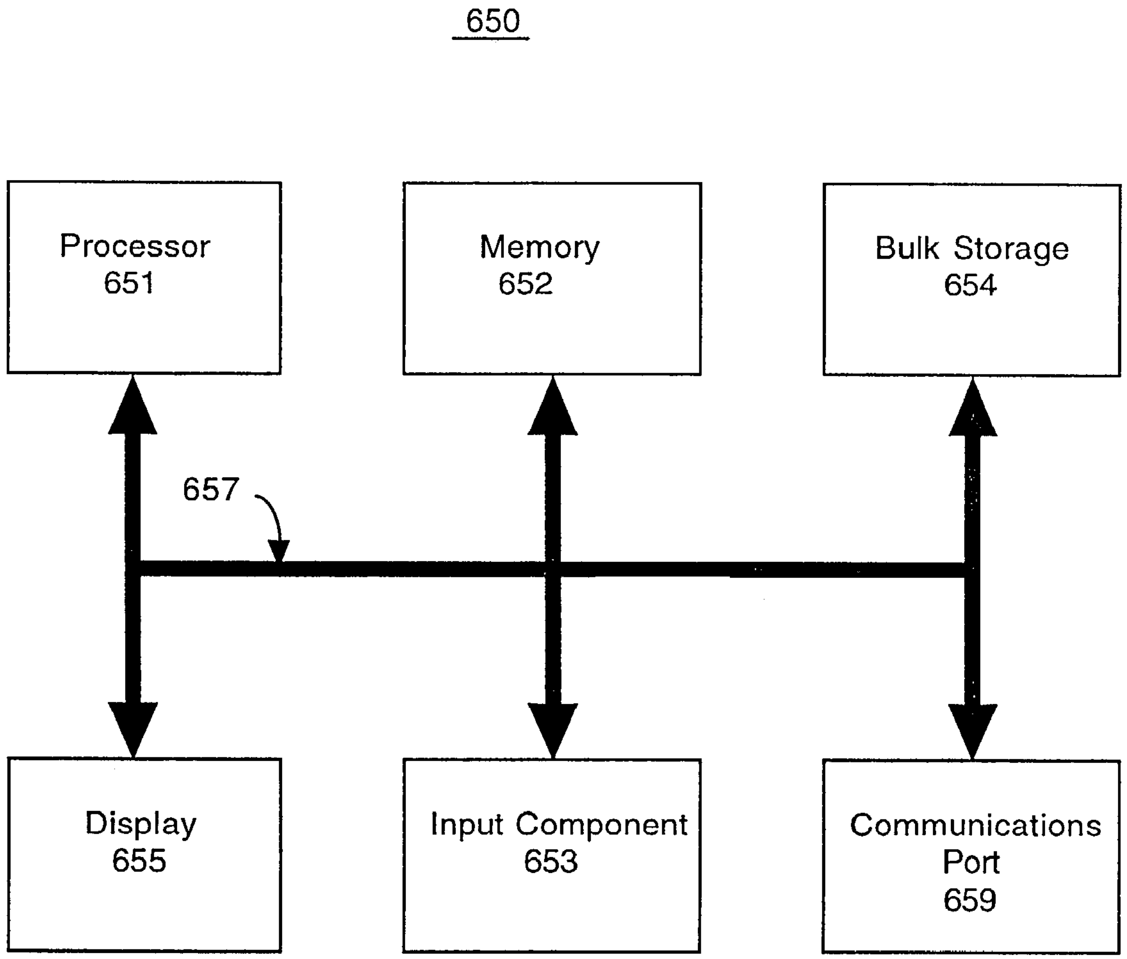
FIG. 6 is a block diagram of one embodiment of a computer system on which the present invention may be implemented.

FIG. 6 is a block diagram of computer system 650, one embodiment of a computer system on which the present invention may be implemented. For example, computer system 650 can be utilized to implement emulation internal representation revision method 200, and JAVA emulation revision system 300. Computer system 650 includes communication bus 657, processor 651, memory 652, input component 653, bulk storage component 654 (e.g., a disk drive), network communication port 659 and display module 655. Communication bus 657 is coupled to central processor 651, memory 652, input component 653, bulk storage component 654, network communication port 659 and display module 655. The components of computer system 650 cooperatively function to provide a variety of functions, including performing emulation application revision in accordance with the present invention. Communication bus 659 communicates information. Processor 651 processes information and instructions, including instructions for changing a canonical indexing (e.g., ordered listing 100) of emulation application information (e.g., JAVA class revisions). The instructions can be performed by processor 651 with out shutting down an emulation virtual machine that is implemented by processor 651 to perform the emulation application. Memory 652 stores information and instructions, including for instructions for changing the canonical indexing of the emulation application information. Bulk storage component 654 also provides storage of information. Input component 653 facilitates communication of information to computer system 650. Display module 655 displays information to a user. Network communication port 659 provides a communication port for communicatively coupling with a network.

Figure 7:
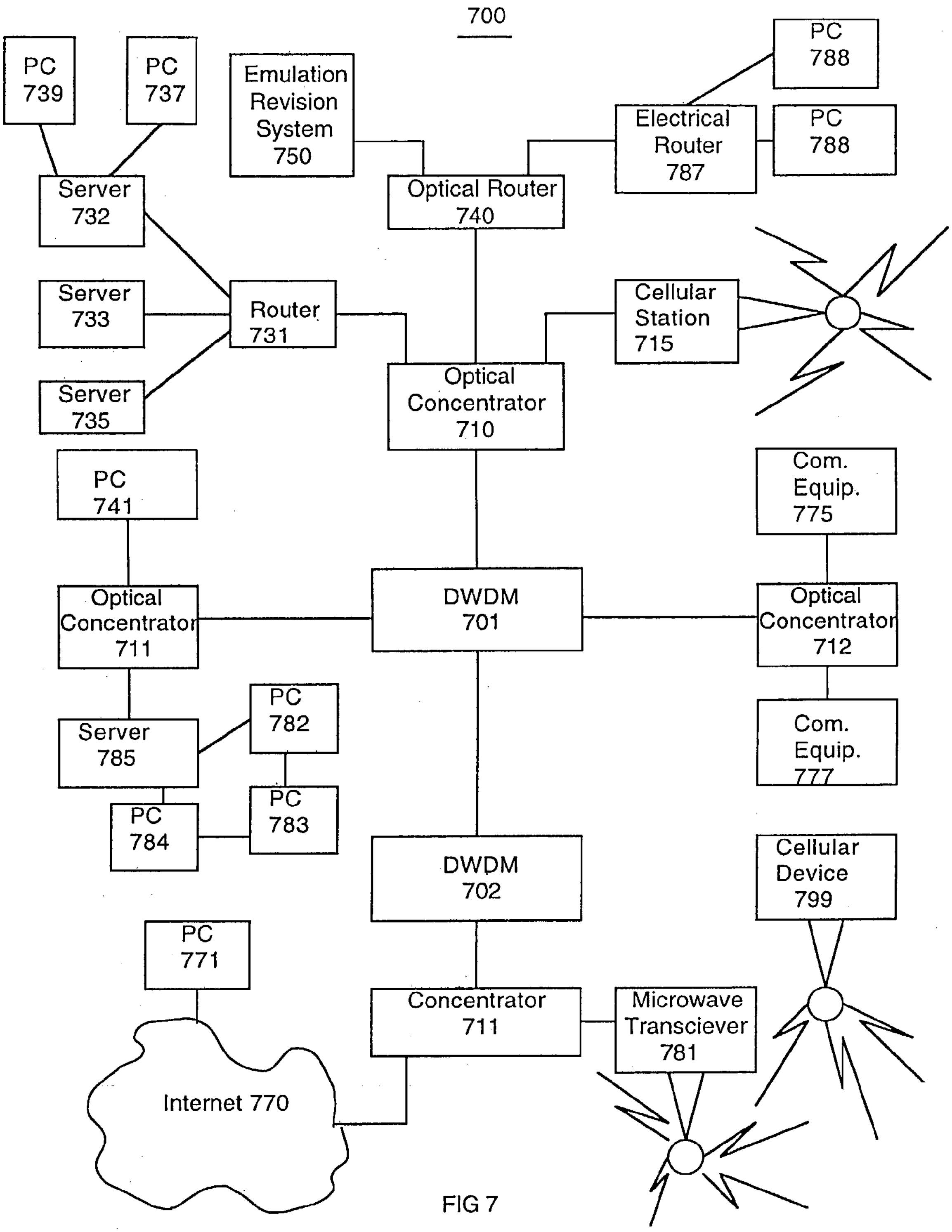
FIG. 7 is a block diagram of one exemplary communication network in accordance with the present invention.

In one embodiment, the present invention is implemented on devices (a computer system, embedded devices, etc.) connected via a communication network. FIG. 7 is a block diagram of communication network 700, one exemplary communication network in accordance with the present invention. In one embodiment of the present invention, emulation application revision information is communicated via communications network 700. Communication network 700 comprises computer system 650 for providing dynamic emulation class revision, dense wave division multiplexer (DWDM) 701 and 702, optical concentrators 710, 711, 712 and 717, routers 731, 740 and 787, cellular station 715, cellular device (e.g., phone, handheld computer, etc.) 799, microwave transceiver 781, Internet 770, servers 785, 732, 733 and 735, personal computers 737, 739, 741, 771, 782, 783, 784, 788 and 789, and miscellaneous communication equipment 775 and 777. The components of communications network 700 communicate with each other over a variety of architectures utilizing numerous communication protocols. One exemplary implementation of communications network 700 utilizes Fiber Distributed Data Interface (FDDI), Dynamic Packet Transport (DPT), Packet Over Sonet (POS), Asynchronous Transfer Mode (ATM), Ethernet, token ring, Transmission Control Protocol/Internet Protocol (TCP/IP), plain old telephone system (POTS), Cable, Digital Subscriber Line (DSL), etc.

Thus, the present invention facilitates efficient dynamic emulation application information revision. Systems and methods of the present invention enable emulation class alterations to be implemented on the fly without shutting down an emulation virtual machine engaged in processing associated with the emulation application information revisions. The present invention also enables processing to resume at a point or state at which the emulation class revisions are initiated. For example, JAVA virtual machine processing threads can continue from a point at which JAVA class revisions are introduced. The present invention includes features for ensuring data consistency is maintained throughout the revision process. The present invention also includes features to ensure that programming dependency relations are maintained and appropriate adjustments to superclasses and subclasses are implemented to reflect changes included in the emulation application revisions.

The foregoing descriptions of specific embodiments of the present invention have been presented for purposes of illustration and description. They are not intended to be exhaustive or to limit the invention to the precise forms disclosed, and obviously many modifications and variations are possible in light of the-above teaching. The embodiments were chosen and described in order to best explain the principles of the invention and its practical application, to thereby enable others skilled in the art to best utilize the invention and various modifications as are suited to the particular use contemplated. It is intended that the scope of the invention be defined by the Claims appended hereto and their equivalents.

What is claimed is:

1. An emulation internal representation revision method comprising:

receiving an indication of a revision to loaded emulation code;

creating conditions for maintaining consistency, said creating comprises selectively preventing processing pipeline operations related to a class of said emulation code to be revised, such that a non-initiated processing pipeline operation associated with said emulation code to be revised is prevented from being initiated; an already initiated processing pipeline operation associated with said class of emulation code to be revised is permitted to be completed; and a processing pipeline operation not associated with said class of emulation code to be revised is permitted to be initiated and completed;

revising an ordered listing which provides an index correspondence to said loaded emulation code; and incorporating information from a revised version of said ordered listing in an internal representation of said loaded emulation code, such that a virtual machine implementing said loaded emulation code is not shut down.

2. An emulation code revision method of claim 1 further comprising adjusting an offset indicator associated with said ordered listing to correspond with said revision to said loaded emulation code.

3. An emulation code revision method of claim 1 wherein said ordered listing comprises a listing of index references.

4. An emulation code revision method of claim 3 wherein said revising said ordered listing comprises:

determining if said revision to said emulation code includes an addition or deletion of a code structure identifier in said emulation code; and making a corresponding adjustment to the listing of index references.

5. An emulation code revision method of claim 4 wherein said corresponding adjustment to said listing of index references comprises:

adding an index reference to correspond to an addition of said code structure identifier;

removing an index reference to correspond to a deletion of said code structure identifier; and adjusting index reference values to compensate for continued ordered listing of said code structure identifiers.

6. An emulation code revision method of claim 4 wherein said corresponding adjustment to said listing of index references comprises:

marking deleted index references as obsolete;

adding an extended list section for new information; and inserting a pointer for pointing to index references in said extended list section.

7. An emulation code revision method of claim 1 wherein said incorporating information from said ordered listing includes replacing code structure identifiers with ordered listing index references.

8. An emulation revision system comprising:

means for communicating information;

means for processing said information, including instructions for changing a canonical indexing of emulation application information without shutting down a virtual machine being implemented by said means for processing, said means for processing performs an emulation internal representation revision method that comprises selectively preventing processing pipeline operations, such that a non-initiated processing pipeline operation associated with said changing of said canonical indexing of emulation application information is prevented from being initiated; an initiated processing pipeline operation associated with said changing of said canonical indexing of emulation application information is permitted to be completed; and a processing pipeline operation that is not associated with said changing of said canonical indexing of emulation application information is permitted to be initiated and completed, said means for processing said information coupled to said means for communicating information; and means for storing said information, including said instructions for changing said canonical indexing of emulation application information, said means for storing said information coupled to said means for communicating information.

9. The emulation revision system of claim 8 wherein said emulation application information comprises code structure identifiers.

10. The emulation revision system of claim 8 wherein said changes in said canonical indexing corresponds to an emulation class definition change.

11. The emulation revision system of claim 8 wherein said instructions for dynamically revising emulation application information include instructions for determining and implementing superclasses and subclass changes associated with revised emulation application information.

12. The emulation revision system of claim 8 wherein said means for communicating is coupled to a network and changes to emulation language represented by said canonical indexing are communicated via said network.

13. The emulation revision system of claim 8 wherein said means for processing emulates a virtual machine.

14. A computer usable storage medium having computer readable program code embodied therein for causing a computer system to implement dynamic emulation class alteration instructions comprising:

a bytecode loading module for loading class bytecode information;

a bytecode modification detection module for detecting modifications to at least one of a plurality of internal representations and said bytecode modification detection module selectively preventing a non-initiated instruction from an emulation application that includes revised class information to enter a virtual machine pipeline associated with said class to be revised, selectively allowing an instruction already initiated into said virtual machine pipeline associated with said class to be revised to be completed; and permitting a processing pipeline operation not associated with said class to be revised to be initiated and completed; and a condensed expression generation module for generating a condensed internal expression of said loaded bytecode including detected modifications.

15. A computer usable storage medium of claim 14 wherein said bytecode loading module, said bytecode modification detection module, and said condensed expression generation module are part of a virtual machine.

16. A computer usable storage medium of claim 14 wherein said condensed internal expression of the loaded bytecode generated by said condensed expression generation module includes adjustments in offsets to compensate for said modifications.

17. A computer usable storage medium of claim 16 further comprising a related information analysis module for ascertaining related emulation application information impacted by said altered emulation class information.

18. A computer usable storage medium of claim 17 wherein said related information analysis module makes alterations to said related internal representations, wherein said alterations correspond to said modifications.

19. A computer usable storage medium of claim 18 wherein said corresponding alterations include changing dependency information included in said related internal representations.

20. A computer usable storage medium of claim 14 further comprising an internal representation loading module for internally loading said condensed internal expression.

* * * * *

UNITED STATES PATENT AND TRADEMARK OFFICE

CERTIFICATE OF CORRECTION

PATENT NO. : 7,308,685 B2

APPLICATION NO. : 10/439053

DATED : December 11, 2007

INVENTOR(S) : Vanish Talwar et al.

It is certified that error appears in the above-identified patent and that said Letters Patent is hereby corrected as shown below:

In column 13, line 18, delete "Hand" and insert -- 11 and --, therefor.

Signed and Sealed this

Twenty-fourth Day of June, 2008

JON W. DUDAS

*Director of the United States Patent and Trademark Office*